March 26, 1935. A. Y. DODGE 1,995,380
LUBRICATING DEVICE
Filed April 20, 1932 3 Sheets-Sheet 1

INVENTOR.
ADIEL Y. DODGE
BY John A. Watson
ATTORNEY.

March 26, 1935.　　A. Y. DODGE　　1,995,380
LUBRICATING DEVICE
Filed April 20, 1932　　3 Sheets-Sheet 2
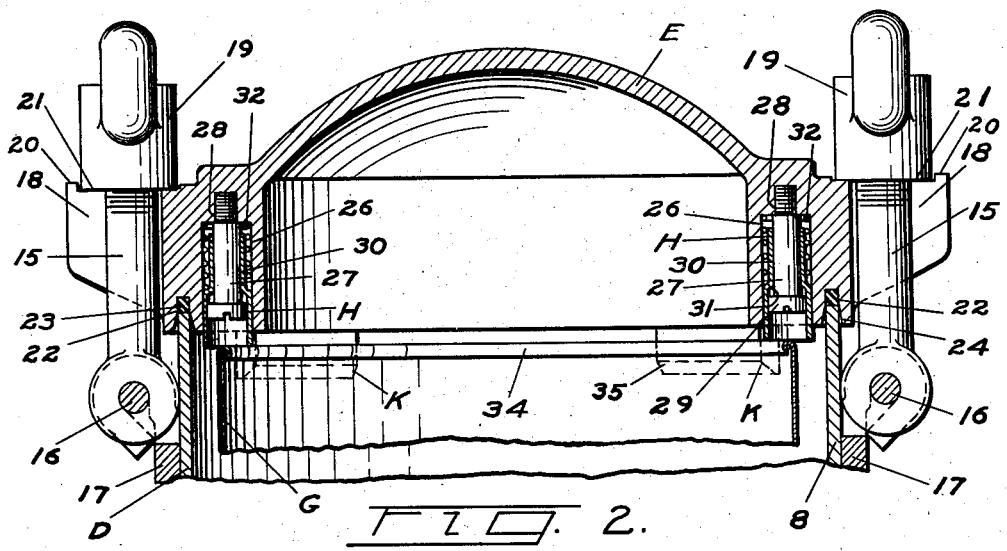
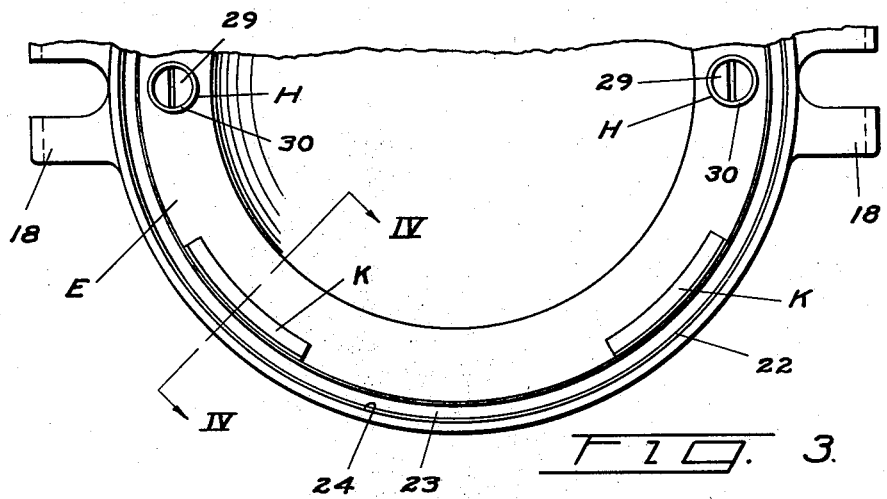
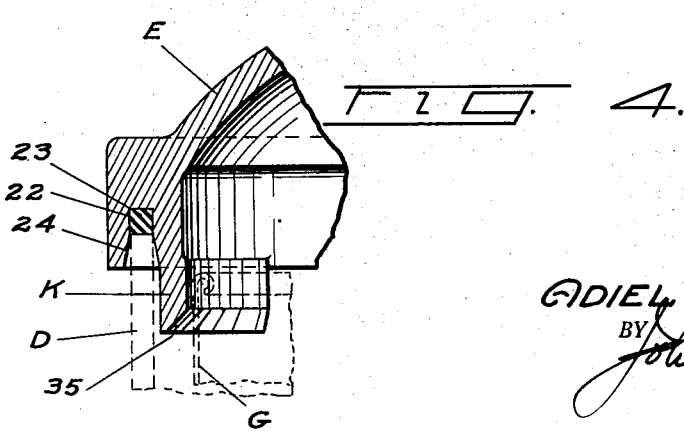
INVENTOR.
ADIEL Y. DODGE
BY
ATTORNEY.

March 26, 1935.　　　A. Y. DODGE　　　1,995,380

LUBRICATING DEVICE

Filed April 20, 1932　　3 Sheets-Sheet 3

INVENTOR.
ADIEL Y. DODGE
BY
ATTORNEY.

Patented Mar. 26, 1935

1,995,380

UNITED STATES PATENT OFFICE 1,995,380

LUBRICATING DEVICE

Adiel Y. Dodge, South Bend, Ind., assignor to The Lubrication Corporation, South Bend, Ind., a corporation of Delaware Application April 20, 1932, Serial No. 606,399

20 Claims. (Cl. 221—47.1)

This invention relates to improvements in lubrication devices and particularly to containers such as used in lubricant dispensers for confining lubricant in bulk or in cartridge form under operating pressures.

An object of the invention is to provide a lubricant container having a removable head incorporating means for resisting distortion of the container head at its periphery. This advantage is of particular importance where lubricant in the container is retained under fluid pressure necessitating close tolerances for packing means between the container casing and the head.

Another object is to provide a lubricant container for housing lubricant in cartridges wherein the cartridge is held centrally within the container and end thrust applied thereto to insure alignment and a proper seal between the cartridge and the lubricant conducting cartridge connector stud upon which the cartridge is supported and communication through the container established.

A further object is to provide a lubricant container of the character described wherein the structure for applying end thrust to the cartridge may function even though the adjacent end walls of the cartridge may be misshapen as through careless handling.

A still further object is to provide means for positioning a lubricant cartridge within the container so as to insure a proper seal at the connection between the cartridge outlet and the container outlet. The cartridge positioning and thrust applying means may be combined, semi-independent or wholly independent as preferred.

Other objects, the advantages and uses of the invention will be, or should become apparent after reading the following description and claims and after consideration of the accompanying drawings forming a part of this specification, in which:

Fig. 2 is a sectional view along the line II—II of Fig. 1;

Fig. 3 is a partial bottom plan view of the container head;

Fig. 4 is a sectional view along the line IV—IV of Fig. 3;

Figure 1:
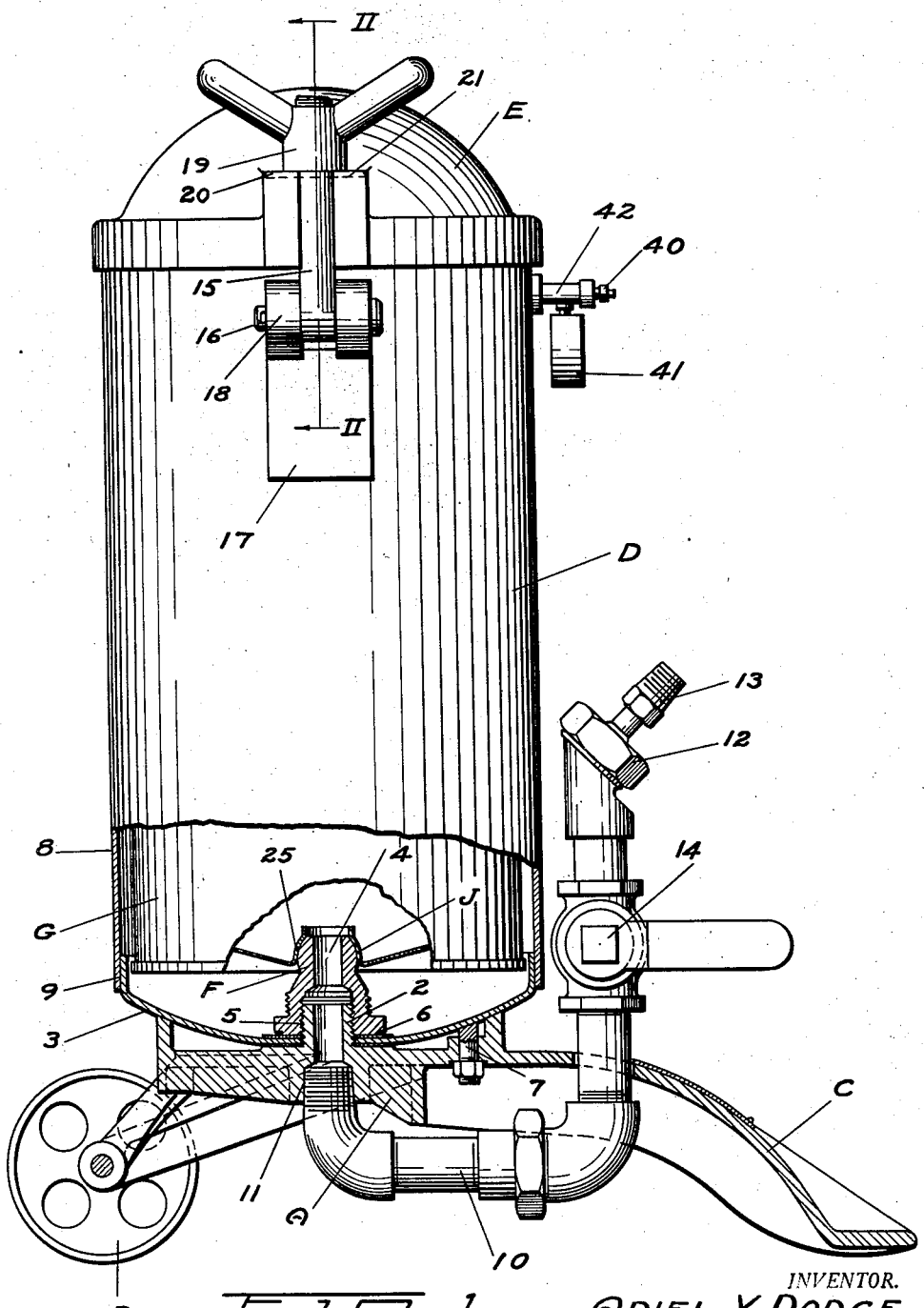
Fig. 1 is an elevation partly in section of a lubricant dispenser embodying my improved lubricant container.

In general the apparatus selected to illustrate my invention comprises a semi-portable lubricant dispenser having a support frame A provided with wheels B and a skid C. The lubricant container is mounted upon the support A in upright position and includes a casing D, a removable head E, a cartridge connector stud F extending through the bottom wall of the casing, a lubricant cartridge G and mechanism H associated with the head E for applying end thrust to the upper end of the cartridge G for maintaining a seal between the cartridge outlet orifice J and the connector stud F. The head E of the container may further include a plurality of integral depending members K for laterally aligning the cartridge G in the casing and for lending support to the inner side walls of the casing against distortion.

The support A may be of cast grey iron and is provided with an upstanding and externally threaded tubular neck 2 extending through the crowned lower end wall 3 of the casing D. The cartridge connector stud F is formed with a portion of its lubricant conducting passage 4 internally threaded at 5 for threaded engagement with the neck 2. The stud F has a hexagonal flange 6 by means of which the stud may be turned upon the neck 2 to draw the casing wall 3 in engagement tightly with the support A. Additional casing securing means is provided in a bolt and nut assembly 7 thus assuring the rigid mounting of the container upon the support. The end wall 3 of the casing may be secured to its tubular steel side wall 8 by welding the overlapping portions 9 or by any other well known fastening means.

Lubricant may be conducted from the connector stud F through the support A through a rigid conduit 10 formed of a series of elbows and pipe lengths one end of which is connected by threaded engagement at 11 to the lower end of the bore of the tubular neck 2. A manually operated valve 14 is associated with the conduit 10 for controlling the passage of lubricant therethrough and the outer end of the conduit has a swivel joint 12 provided with an externally threaded coupler stud 13 by means of which the conduit may be connected with a flexible hose or other lubricant conducting apparatus for carrying lubricant to the lubricant discharge nozzle or similar device through which lubricant is to be dispensed.

With reference to Figs. 1 and 2 it will be noted that the removable head E may be of a casting such as grey iron and is secured to the casing D by a pair of draw bolts 15 pivotally secured at 16 to steel straps 17. The straps 17 may be secured to the outer walls of the casing D by spot welding. The head E has a pair of bifurcated ears 18 on diametrically opposite sides which register with the draw bolts 15 to permit the bolts to be swung between the forked structure of the ears. Wing nuts 19 are provided for the draw bolts 15 and arranged to bear against the upper and flat surface 21 of the ears 18 so that when the wing nuts are turned down the head E will be drawn toward the adjacent end wall of the casing. The ears are each formed with flanges 20 extending upwardly from the surfaces 21 at the outer edges thereof to locate the wing nuts 19 on the surfaces 21 and for purposes herein after described.

In order that an air and lubricant tight seal may be maintained between the casing D and the head E, the head is formed with a deep annular groove 22 in its lower end wall within which a packing gasket 23 is disposed. The outer portions of the side walls of the groove 22 are flared outwardly, as shown at 24 in Fig. 4 so as to facilitate registration between the groove and the upper edge of the casing D regardless of slight distortion of the upper casing wall which might be present as the result of long usage. When the wing nuts are turned down tightly the gasket 23 will become compressed between the upper edge of the casing and the walls of the groove to effect an air and lubricant tight seal therebetween of a relatively high order. It will be noted that the end wall of the head E is provided with a substantial crown thus greatly increasing the rigidity thereof as well as providing increased space within the container exteriorly of the cartridge for confining air under pressure as a medium for the discharge of lubricant from the dispenser.

It is desirable that the cartridge G when employed as a source of lubricant supply within the container be held centrally within the casing D in axial alignment with the connector stud F and that downward thrust be applied to the cartridge for causing close engagement between the discharge orifice J of the cartridge and the coacting contact surface 25 of the cartridge connector stud F in order that a most efficient lubricant tight seal may be maintained.

The mechanism H incorporated in the head E is employed to apply end thrust to the cartridge G for the purpose described. This mechanism includes bores 26 formed on the inner and lower wall of the head E at diametrically opposite sides of the head and aligned with the ears 18. Machine screws 27 are secured by threaded engagement at 28 to the head E centrally within the bores 26. The screws 27 are arranged with their enlarged heads 29 lying inwardly of the mouths of the bores. Steel sleeves 30 are slidably disposed upon the screws 27 and each formed with inner portions adapted to closely engage the shank of its associate screw and with a portion of greater internal diameter adapted to move over the side walls of the heads 29 of the screws. This construction affords a shoulder 31 on the outer wall of each sleeve against which a compression spring 32 disposed about the outer wall of the reduced portion of the sleeve bears. The inner ends of the springs may bear against the end walls of the bores 26. The sleeves 30 are thus urged outwardly of the bores by the springs 32 so that when the head E is disposed upon the casing D the annular and enlarged ends of the sleeves will bear directly upon diametrically opposite portions of the upper end of the cartridge to apply a downwardly directed thrust thereupon. It will be noted that the cartridge G has a beaded reinforcing portion 34 at its upper end for the purpose of lending rigidity and strength thereto. In providing the mechanism H with pressure applying members in the form of the sleeves 30 I have anticipated possible distortion of the upper end of the cartridge such as might result through abuse or dropping the cartridge accidently upon the upper end to cause the walls to move either inwardly or outwardly from their normal position. Despite such possible irregularity in shape the thrust applied to the cartridge may remain unchanged.

The members K formed integrally with the head E perform a dual function in that when the head E is placed upon the casing D the members K are interposed between the inner side walls of the casing and the adjacent outer side walls of the cartridge G to compel the upper end of the cartridge to assume a central position within the casing. Lateral alignment of the lower end of the cartridge is automatically obtained through the registration of the discharge orifice J and the connector stud F. In order that the upper end of the cartridge may not be abused through the forceful application of the head E to the casing by engagement of the members K therewith the lower and inner edges of the members K are beveled, as shown at 35, thus serving to guide the cartridge to its central location within the casing as the head is applied thereto. The second function of the members K whether the container be used with a cartridge as the cartridge G or for the disposition of bulk lubricant within the casing is that of lending additional ridigity to the head to discourage distortion of the head particularly when subjected to high internal pressures. The apparatus illustrated herein shows four of the members K formed on the head E equally spaced apart from one another though a lesser or greater number of these members may be employed if desired.

Means for admitting air under pressure to the interior of the container subsequent to the placing of lubricant either in bulk or by cartridge D therein and after the head E is fixed thereto is provided for in an air intake valve 40 of the type commonly used on automobile tires. This valve may be connected in the usual manner directly with an air pressure hose line until pressure within the container has been attained to the required degree, as shown by a pressure gauge 41 which may be connected directly to the air inlet conduit 42 with which the valve 40 is associated.

A considerable quantity of air under pressure may be confined within the container due to the crowned end wall of the head E over the lubricant contents thereof so that replenishment of air under pressure may not be necessary until after a considerable amount of lubricant has been dispensed through the conduit 10 and the control valve 14.

The removal and replacement of the head E is a simple operation which may be performed in an unusually short space of time due to the provision of the wing nuts 19 and cooperating ears 18 of the head. The disposition of the cartridge G within the casing after the head has been removed is a process of utmost simplicity as both the lower end of the cartridge and upper end of the cartridge are automatically moved and guided to their proper operative position along the axis of the casing by engagement with the stud F and through the cooperation of the members K of the head E as the head is lowered in place. Immediately upon the drawing of the head E down upon the casing D the mechanism H functions to apply the necessary and predetermined thrust upon the cartridge G to assure a seal between the discharge orifice of the cartridge and the stud F.

The primary purpose of the flanges 20 on the outer ends of the ears 18 aside from serving to locate the base of the wing nuts 19 upon the surface 21 of the ears is that of preventing injury to one standing near and particularly over the dispenser in the event that one of the bolts 15 should break or become torn from its fastening due to pressure exerted upon the head from within the container. Without the flanges 20 the head, under such circumstances, might be forcefully propelled through the air to cause serious injury to anyone close by. The flanges however would cause the cover to hinge about the remaining intact draw bolt and wing nut until sufficient expansion of air from within the container had taken place to remove all danger of the head being blown upwardly with appreciable force.

Figure 5:
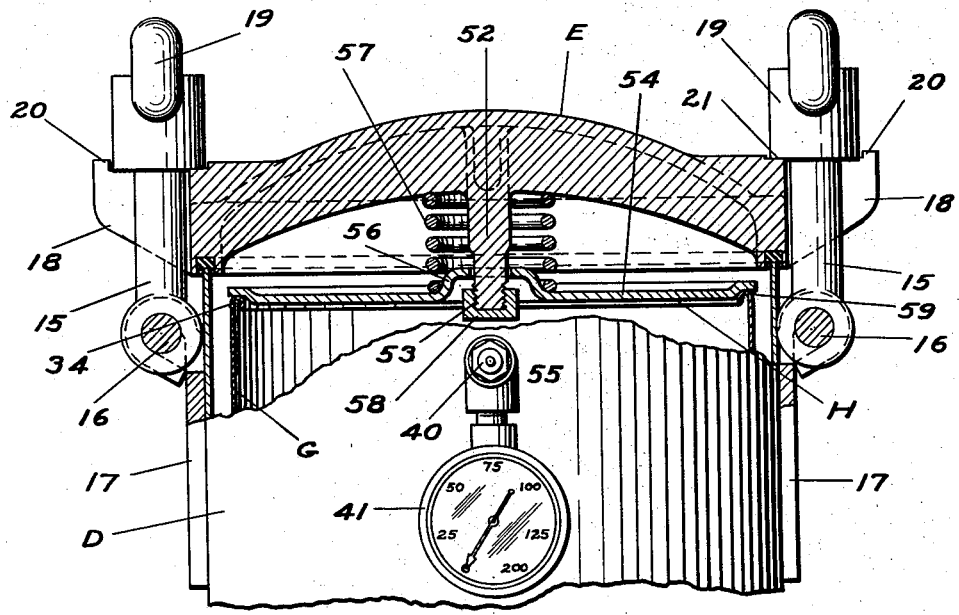
Fig. 5 is a fragmentary view partially in section illustrating a modified form of the container head structure.
Figure 6:
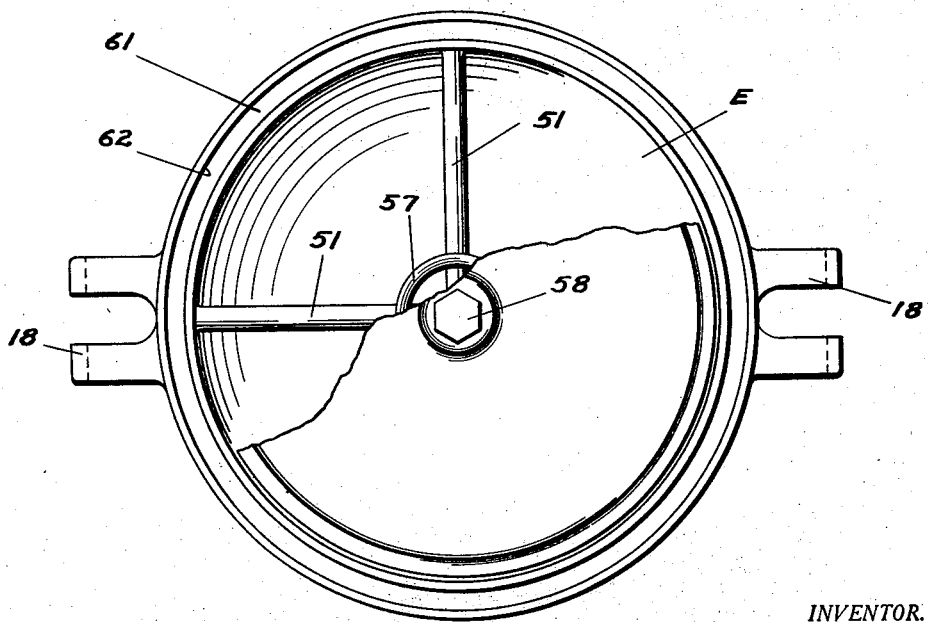
Fig. 6 is a bottom plan view of the head illustrated in Fig. 5, with a part thereof broken away.

In Figs. 5 and 6 I have illustrated another form of the lubricant container which is similar in some respects to that shown in Figs. 1 to 4 and like reference numerals have been used to designate like parts. The container differs however, in certain structure of the head assembly and particularly the mechanism H. The end wall of the head E is crowned by a longer radius than that employed in the design in the first described form and has a plurality of equally spaced apart depending ribs 51 on the inner surface thereof for the purpose of lending rigidity thereto. An integral stud 52 is formed on the inner wall of the head E upon the axis thereof and extends downwardly beyond the bottom wall of the head. The outer end of the stud 52 is externally threaded, as shown at 53, a circular steel plate 54 having a central aperture 55 is disposed concentric and about the stud 52 by the projection of the stud through the hole 55. The plate 54 is formed with the central portion struck upwardly at 56, as viewed in Fig. 5 to form a guide about which one end of the compression spring 57 is disposed to bear upon the upper face of the plate. The other end of the spring 57 bears against the adjacent face of the spaced apart ribs 51 thereby producing an axial thrust upon the plate 54. A screw threaded cap 58 is engaged with the threaded and outer end of the stud 53 so as to limit the axial movement of the plate 54 under pressure of the spring 57 as when the head is removed from the container. The outer end of the plate 54 is annularly depressed, as shown at 59, about its periphery so as to engage with the upper and adjacent beaded edge 34 of the cartridge G at such times as when the container is employed with the cartridge.

It will be noted that the mechanism H of that form of the container shown in Figs. 5 and 6 possesses the same advantage as that illustrated in Figs. 2 and 3 in that thrust is equally aportioned upon diametrically opposite sides of the end of the cartridge as well as about the entire periphery and that the mechanism H possesses the added advantage of centrally locating the upper end of the cartridge within the casing of the container. The packing between head and casing comprises an annular packing gasket 61 disposed in a groove 62 formed circumferentially about and within the lower end wall of the head so as to engage with the upper edge of the casing wall.

It is to be understood that the embodiments of the invention herein set forth are presented for the purpose of illustration only, and various changes may be made without departing from the spirit of the invention and the scope of the claims.

I claim:

1. A container for confining fluids or semifluids under pressure comprising, a casing, a cartridge connector stud secured internally of one end of said casing and forming a discharge outlet passageway, a fluid cartridge disposed within said casing having means at one end providing a discharge outlet opening, said means being engageable with said connector stud, a removable head forming a closure for the opposite end of said casing, and mechanism including a resilient element associated with said head for applying axial thrust to the perimeter of the other end of said cartridge resiliently to urge the cartridge toward said cartridge connector stud.

2. A container for confining fluids or semifluids under pressure comprising, a casing, a fluid containing cartridge in said container, a removable head forming a closure for one end of said casing, said head having a plurality of depending members spaced apart from one another in annular array and adapted to enter said casing and to lie adjacent to the inner side wall of said casing, said depending means centering said cartridge in the container, and means for securing the head tightly upon said casing.

3. A container for confining a fluid cartridge having an outlet orifice at its lower end comprising, a casing, a cartridge connector stud secured at one end of said casing and presenting a cartridge engaging surface within said casing for engagement with said cartridge about its outlet orifice, and a removable head forming a closure for the opposite end of said casing, said head being provided with means for engaging with, guiding and locating the upper end of said cartridge centrally within the casing upon the fixing of the head in place thereupon.

4. A container for confining a fluid cartridge having an outlet orifice at its lower end comprising, a casing, a cartridge connector stud at one end of said casing and presenting a cartridge engaging surface within said casing for registration with said cartridge about its discharge orifice, and a removable head forming a closure for the opposite end of said casing, said head being formed with a plurality of depending members spaced apart from one another and adapted to enter said casing and to locate the upper end of said cartridge within the casing.

5. A container for confining fluids or semifluids under pressure comprising, a casing having a substantially open end and a closed end having an orifice therethrough to the exterior thereof, a cartridge connector stud secured centrally of said closed end of said casing and providing with said casing orifice a discharge outlet passageway, a fluid cartridge disposed within said casing and having an outlet opening registrable with said outlet passageway, a removable head forming a closure for the opposite end of said casing, mechanism associated with said head for applying axial thrust to said cartridge to urge the cartridge toward said cartridge connector stud, and means carried by said head for locating the upper end of the cartridge centrally within the casing when said head is in place thereon.

6. A container for confining fluids or semifluids under pressure comprising, a cylindrical casing presenting an unobstructed annular edge at one end, a removable head forming a closure for said casing, said head having an annular groove therein adapted to receive said annular edge of said casing end, said groove being provided with perpendicular side walls at the inner portion thereof and with contiguous outwardly flaring side walls adjacent the mouth of the groove, and means for drawing said head down upon said casing.

7. A container for confining fluids or semifluids under pressure comprising, a cylindrical casing presenting an unobstructed annular edge at one end, a removable head forming a closure for said casing, said head having an annular groove therein adapted to receive said annular edge of said casing end, said groove being provided with perpendicular side walls at the inner portion thereof and with contiguous outwardly flaring side walls adjacent to the mouth of the groove, and means for drawing said head down upon said casing, said means including ears formed upon opposite sides of said head and draw bolt assemblies pivotally mounted upon said casing and arranged to be pivoted into registration with said ears, said ears having upstanding portions extending beyond the plane of contact between said draw bolt assemblies and said ears.

8. A container for confining fluids or semifluids under pressure comprising, a casing, a cartridge connector stud disposed at one end of said casing and provided with a discharge outlet passageway from the interior of the casing, a fluid cartridge disposed within said casing having a discharge outlet opening registerable with said passageway in said connector stud, a removable head forming a closure for the opposite end of said casing, and mechanism associated with said head for applying axial thrust to said cartridge to urge the cartridge toward said cartridge connector stud, said mechanism including a pair of depending spring pressed members located upon diametrically opposite sides of said head and adapted to extend into said casing and engage with substantially opposite portions of the upper end of said cartridge when the head is in place upon the casing.

9. A container for confining fluids or semifluids under pressure comprising, a casing, a removable head for said casing, means for securing said head upon said casing to form a fluid tight seal therebetween, said securing means including draw bolts associated with one of said elements and ears formed on the other element, said ears having flanges extending parallel to the axes of said draw bolts when the bolts are engaged with said ears, said ears lying outwardly beyond those surfaces of said ears contacted by said draw bolts, and a plurality of depending members spaced apart from one another on said head in annular array and adapted to enter the casing and to lie adjacent to the inner side walls of said casing for locating a receptacle within the container in spaced relation to the inner wall of the container.

10. A container for confining a fluid cartridge having an outlet orifice at its lower end comprising, a casing, a cartridge connector stud extending through one end of said casing and presenting a cartridge engaging surface within said casing for registration with said cartridge discharge orifice, and a removable head forming a closure for the opposite end of said casing, said head being formed with a plurality of depending members spaced apart from one another and adapted to enter said casing and to locate the said cartridge within the casing, said members having their lower and inner edges beveled to engage with and guide the cartridge to its central location as said head is lowered upon the casing.

11. A container for confining fluid containing cartridges comprising, a casing adapted to receive said cartridge, a removable head forming a closure for said casing, a pair of diametrically opposed members for drawing said head tightly upon said casing, and a pair of diametrically opposed spring pressed members carried by said head, said spring pressed members being adapted to engage with the adjacent end of said cartridge to apply axial thrust thereto away from said head.

12. A container for confining fluids or semifluids under pressure comprising, a casing, a cartridge connector stud at one end of said casing and providing a discharge outlet passageway, a fluid containing cartridge disposed within said casing having a discharge outlet opening engageable with said connector stud, a removable head forming a closure for the opposite end of said casing, and mechanism associated with said head for applying axial thrust to said cartridge to urge the cartridge toward said cartridge connector stud, said mechanism including a plate having a floating connection with said head and adapted to bear upon the upper end of said cartridge, and resilient means tending to urge said plate toward said cartridge along the axis thereof.

13. A container for confining a fluid containing cartridge having an outlet orifice at its lower end comprising, a casing, a cartridge connector stud one end of said casing and presenting a cartridge engaging surface within said casing for engagement with said cartridge about said discharge orifice, a removable head forming a closure for the opposite end of said casing, said head being formed with a centrally located and depending stud, a cartridge engaging plate encompassing said stud and having limited axial movement thereupon, and resilient means for urging said plate inwardly of the casing thereby to exert end thrust upon the cartridge toward said connector stud when the head is in place.

14. A container for confining a fluid containing cartridge having an outlet orifice at its lower end comprising, a casing, a cartridge connector stud secured at one end of said casing and presenting a cartridge engaging surface within said casing for engagement with said cartridge about said discharge orifice, a removable head forming a closure for the opposite end of said casing, said head being formed with a centrally located and depending stud, a cartridge engaging plate encompassing said stud and having limited axial movement therupon, and resilient means for urging said plate inwardly of the casing thereby to exert end thrust upon the cartridge toward said connector stud when the head is in place, said plate being circumferentially recessed to receive the upper edge of the cartridge to locate the cartridge coaxial with the plate.

15. In a container adapted to receive a cartridge containing a substantially fluid commodity and having a discharge opening at one end, means providing a housing for the cartridge, said means having a normally closed end and an open end for reception of the cartridge, closure means for said open end, and spring devices associated with one of said means and with the side walls of the cartridge for resiliently urging said cartridge toward said closed end.

16. In a pressure container adapted loosely to receive a cartridge containing a substantially fluid commodity and having a discharge opening at one end, means providing a housing for the cartridge, said means having a normally closed end and an open end for reception of the cartridge, the side wall of the cartridge when the cartridge is disposed in the housing being spaced from the wall of the housing, closure means for said open end, and means associated with one of said means for centering the cartridge within the container.

17. In a pressure container adapted loosely to receive a cartridge containing a substantially fluid commodity and having a discharge opening at one end, means providing a housing for the cartridge, said means having a normally closed end and an open end for reception of the cartridge, the side wall of the cartridge when the cartridge is disposed in the housing being spaced from the wall of the housing, closure means for said open end, and means associated with one of said means for centering the cartridge within the container and for resiliently urging the cartridge toward said closed end.

18. A pressure container for confining lubricant in cartridges and in bulk form comprising, a casing having unobstructed inner side walls, a removable head forming a closure for said casing, means for securing said head to the casing to form an air and lubricant tight seal therebetween, and means associated with the head for engaging with, securing and positioning a cartridge within the casing, the last said means also spacing the side wall of the cartridge from the side wall of the casing.

19. A container for confining fluids or semi-fluids under pressure comprising, a casing, a cartridge connector stud disposed at one end of said casing and provided with a discharge outlet passageway, a fluid cartridge disposed within said casing and having a discharge outlet registrable with said passageway in said stud, a removable head forming a closure for the opposite end of said casing, and means including a resilient member carried by said head for applying a thrust against a part of said cartridge thereby to urge the cartridge toward said stud end of the casing and to effect a seal between the cartridge about its outlet opening and said stud about said passageway.

20. A container for confining fluids or semi-fluids under pressure comprising, a casing, a removable head for said casing, means for securing said head upon said casing to provide a fluid tight seal therebetween, said securing means including adjustable drawing devices associated with one of said elements, and connecting means formed on the other element, said connecting means including flanges extending parallel to the direction in which the head is drawn against the casing, and means secured to said head element for locating a cartridge within the container with the side walls of the cartridge in spaced relation to the walls of the container element.

ADIEL Y. DODGE.